United States Patent Office 2,996,356
Patented Aug. 15, 1961

2,996,356
PRODUCTION OF METALLIC HALIDE SALTS
Donald W. Pennington and Donnell A. Ballard, Lake Jackson, and William A. Mod, Freeport, Tex., assignors to The Dow Chemical Company, Midland, Mich., a corporation of Delaware
No Drawing. Filed May 28, 1958, Ser. No. 738,325
8 Claims. (Cl. 23—91)

The invention relates to an improved method of producing water-soluble halides of metals, capable of forming substantially insoluble hydroxides, and particularly to producing magnesium chloride by employing magnesium hydroxide.

Currently magnesium chloride is largely produced by a method including the steps of precipitating magnesium hydroxide by admixing a magnesium salt-containing brine with an aqueous solution of an hydroxide, e.g., NaOH or $Ca(OH)_2$ and thereafter reacting the $Mg(OH)_2$ thus precipitated with concentrated hydrochloric acid to produce $MgCl_2$. The brine employed is usually ocean water which yields only about 25 percent $MgCl_2$ by weight in water by this method. It is desired that a form of $MgCl_2$ be produced which contains at least about 72 percent $MgCl_2$. The $MgCl_2$ content must, therefore, be increased from the 25 percent concentration initially produced to the desirable higher concentration. Evaporation is usually employed to attain this higher concentration.

The principal object of the invention is to provide a method of producing directly a hydrated metal halide consisting of at least about 60 percent by weight of the halide from the hydroxide of the metal without the necessity of subsequent concentration. Another object of the invention is to provide a method of producing a highly concentrated brine of such halide. A further object of the invention is to provide a method of producing such halide substantially free from water-soluble contaminants. The method by which these and related objects of the invention are attained is hereinafter described and concisely stated in the appended claims.

The invention is an improved method of making a halide of a metal which has a substantially water-insoluble hydroxide which involves forming an aqueous suspension of the metal hydroxide, mixing the aqueous suspension with an organic liquid immiscible with water containing an oleophilic surfactant until the organic liquid becomes the continuous phase containing the metal hydroxide and the water of the suspension becomes the discontinuous phase, allowing the mixture to stratify into a water stratum and an organic liquid stratum containing substantially all the metal hydroxide, removing the major portion of water stratum, diluting the organic liquid stratum with additional organic liquid, passing a hydrogen halide either in a concentrated aqueous solution or in a gaseous state into the diluted organic liquid containing the metallic hydroxide to form the corresponding metal halide and thereafter separating the so-formed metal halide from the resulting mixture.

The organic liquid may be any organic solvent which is inert to the compounds involved and immiscible with water. Liquid hydrocarbons and halogenated hydrocarbons are usually used. A petroleum oil, having a viscosity of up to 5,000 centipoises is recommended. Oils having a viscosity of not over 1,000 centipoises are preferred. Fuel oils, motor lubricants, kerosene, diesel oil, chlorinated hydrocarbons, and aromatic hydrocarbons are examples of suitable oils to employ. Kerosene or other light-colored petroleum fractions are usually employed. Hereinafter the organic water-immiscible solvent will be referred to as oil.

The invention is useful in the preparation of the halide of any metal having a substantially water-insoluble hydroxide. Examples of such halides are $MgCl_2$, $AlCl_3$, $CaCl_2$, $MgF_2$ and $AlF_3$. The practice of the invention will be described in reference to the production of magnesium chloride.

$Mg(OH)_2$ for use in the invention may be prepared by a known method which usually consists of precipitating it from a natural brine such as ocean water by reacting the brine with an hydroxide, e.g., $Ca(OH)_2$ or NaOH, and removing the precipitate by settling or filtration.

In practicing the invention, an oleophilic sulfactant or emulsifying agent is dissolved in an oil. The term oleophilic as used herein, means having an affinity for oil, and particularly hydrocarbon oils, and is hydrophobic to the extent that when contained in a mixture of oil and water it dissolves in the oil in preference to the water. The emulsifying agent may be cationic, e.g., Alkaterge T; it may be non-ionic, e.g., Emulphor VN-430; or it may be anionic, e.g., Aerosol OT. The non-ionic are preferred and the anionic are least desirable of the three classes of surfactants. Tall oil type non-ionic surfactants, e.g., Aconew Extra consisting essentially of a mixture of about 98 percent $C_{18}$ and $C_{19}$ fatty acids and about 2 percent abietic acid is the preferred emulsifying agent or surfactant to use. From about 1 to 30 percent of the surfactant based on the weight of the oil is usually used; 2 to 10 percent is preferred.

In accordance with the invention, the $Mg(OH)_2$ is made into an aqueous suspension and the suspension thus made admixed with the oil containing the surfactant. The concentration of the $Mg(OH)_2$ in the suspension may be anywhere between 7 and 75 percent $Mg(OH)_2$ by weight, but is preferably between 15 and 30 percent. The aqueous suspension of $Mg(OH)_2$ is added to sufficient oil containing the surfactant, accompanied by agitation, to make an oil-$Mg(OH)_2$ suspension containing between about 0.1 and 0.75 of oil to 1 part by weight of the $Mg(OH)_2$. Upon bringing together the oil-surfactant solution and the aqueous $Mg(OH)_2$ suspension the oil at first tends to form an upper stratum and the water-$Mg(OH)_2$ suspension to form a lower stratum. However, by continuing agitation, after admixing the oil and the aqueous suspension, for from about 5 to 15 minutes, a substantially unstratified mixture is obtained. With further agitation followed by settling, a phase inversion takes place wherein the oil becomes the continuous phase with the $Mg(OH)_2$ dispersed therein and the water becomes the discontinuous phase. The inversion is manifested by the $Mg(OH)_2$ passing from the water phase into the oil phase forming a suspension therein and the suspension forming a substratum below the water. A major portion of the upper water stratum, substantially freed from $Mg(OH)_2$ and containing a substantial portion of the water-soluble contaminants, is then removed, usually by decantation or draining, and discarded.

The lower stratum consisting of the oil and $Mg(OH)_2$ suspended therein and some water is then diluted by the addition of more oil to attain a $Mg(OH)_2$ concentration of between 1 and 25 percent but usually between 5 and 10 percent. The higher concentrations of $Mg(OH)_2$ are more viscous than the lower ones. Therefore, although the higher concentrations offer a number of economic advantages, the degree of concentration is limited by their increasing the viscosity of the oil-$Mg(OH)_2$ suspension to the point of adversely affecting the stirring properties.

The thus-diluted oil-$Mg(OH)_2$ suspension is placed in a reactor, provided with a stirrer and heating means, and maintained at a temperature of between 25° and 300° C., and preferably between 150° and 200° C. Concentrated hydrochloric acid or hydrogen chloride gas is passed into the oil suspension. The Mg(OH)$_2$ is thus converted to MgCl$_2$ according to the equation:

$$2HCl + Mg(OH)_2 \rightarrow MgCl_2 + 2H_2O$$

To produce the hydrate, the HCl is added as a substantially anhydrous gas. A ratio of about 1 weight unit of hydrogen chloride to between 3 and 10 weight units of the Mg(OH)$_2$-oil suspension is recommended. The rate of passing HCl gas into the suspension is not critical; it is usually from about 0.5 to 2 weight units per hundred weight units of the suspension per minute. The molar ratio of HCl used to Mg(OH)$_2$ in the suspension is between 2 and 4HCl to 1Mg(OH)$_2$. The resulting product is a mixture consisting of between 5 and 15 percent of MgCl$_2$, a major proportion of oil, a minor proportion of water, and the surfactant.

Oil is then removed from the oil-MgCl$_2$ product. Centrifugation is the preferred method of accomplishing the removal. It is recommended that a first centrifugation be followed by the addition of a volatile organic solvent, e.g., benzene, a chlorinated ethylene, or a paraffin hydrocarbon between C$_5$ and C$_8$, and thereafter by centrifugation plus drying to remove the oil, surfactant, and the organic solvent. When anhydrous HCl is used, the resulting product is a MgCl$_2$ hydrate which consists by weight of between ½ and ¾ MgCl$_2$ and the balance substantially water of hydration. The product is substantially free from any water-soluble contaminants. There is a trace of Mg(OH)$_2$. When concentrated hydrochloric acid is used, a highly concentrated brine is obtained. The following example sets forth one mode of practicing the invention.

Example 76.8 grams of Mg(OH)$_2$ were dispersed in 223.2 grams of water to make a 25.6 percent Mg(OH)$_2$ aqueous suspension. 0.7 gram of tall oil was admixed with 31.6 grams of kerosene in a separate container and the mixture then admixed with the aqueous suspension. The resulting mixture was agitated for 4 minutes. At the end of this time, the kerosene replaced the water around the Mg(OH)$_2$ particles, i.e., the Mg(OH)$_2$ was now suspended in the kerosene instead of in the water. 186 grams, which was 83 percent of the water, were then drained off. The resulting product comprised by weight:

| | Percent |
|---|---|
| Mg(OH)$_2$ | 50.4 |
| Water | 24.4 |
| Kerosene | 20.6 |
| Tall oil | 4.6 |

This product was diluted with kerosene to a Mg(OH)$_2$ concentration of 10 percent. 200 grams of the diluted product were placed in a reactor and subjected to high speed agitation while being heated to a temperature of 160° C. Anhydrous HCl was introduced into the reactor just under the stirrer at a flow rate of 1.5 grams per minute. A total of 60 grams of anhydrous HCl were passed into the reactor. The product thus formed in the reactor comprised approximately 10 percent MgCl$_2$ in kerosene with some water.

The MgCl$_2$ product thus produced was centrifuged to remove the major part of the kerosene. The MgCl$_2$ product so separated from the kerosene was admixed with about an equal weight of trichloroethane and again centrifuged to separate the MgCl$_2$ product from the trichloroethane. The product thus obtained was dried at 100° C. to eliminate substantially all the remaining kerosene, tall oil, and trichloroethane. A weight analysis of the product showed it to be a hydrated magnesium chloride consisting essentially of the following:

| | Percent |
|---|---|
| MgCl$_2$ | 69 |
| Mg(OH)$_2$ | 1 |
| Water of hydration | 30 |
| Ca, Na, and B | Trace amounts |

The hydrate thus produced may be used directly as obtained, or it may be completely dehydrated, by removing the water of crystallization, if desired, by known methods.

The practice of the invention as exemplified by the example shows that a halide of a metal, the hydroxide of which is substantially water-insoluble, can be made without the time-consuming and costly step of evaporating to increase the concentration as is done in current practice. It also shows that such a halide may be prepared which is substantially free from all contaminating water-soluble impurities.

Although the use of an anhydrous hydrogen halide is the preferred embodiment of the invention, some of the advantages of the invention can be realized by the use of concentrated aqueous solution thereof, e.g., 30 to 36 percent hydrochloric acid. When the acid is used, MgCl$_2$ brine of near saturation is formed. The brine may be employed in operations requiring a highly concentrated halide brine, or the water may be evaporated off at a substantial saving over costs of evaporating the water from conventional relatively dilute brines.

Having described the invention, what is claimed and desired to be protected by Letters Patent is:

1. The process of making a water-soluble metal halide of a metal, which forms a substantially water-insoluble hydroxide, from an aqueous slurry of an hydroxide of such metal consisting essentially of admixing an organic water-immiscible solvent, substantially inert to said halide and hydroxide, selected from the class consisting of liquid hydrocarbons and liquid halogenated hydrocarbons, and a surface-active emulsifying agent having a greater affinity for hydrocarbons than for water, with an aqueous slurry of a substantially water-insoluble metal hydroxide, continuing to stir to effect intermixing of said organic solvent and said aqueous slurry until a phase separation occurs whereby an oil phase containing substantially all the water-insoluble hydroxide forms a lower stratum and an aqueous phase containing a substantial portion of the water-insoluble contaminants of said hydroxide forms an upper phase, passing a hydrogen halide into the organic phase at a temperature of between 25° and 300° C. to convert the metal hydroxide present to the corresponding halide, and separating the thus formed metal halide from the resulting mixture.

2. The process according to claim 1 wherein the water-insoluble hydroxide is Mg(OH)$_2$ and the hydrogen halide is substantially anhydrous hydrogen chloride gas whereby MgCl$_2$ hydrate is produced.

3. The process of making MgCl$_2$ hydrate of at least 60 percent MgCl$_2$ according to claim 2, wherein said hydroxide is the hydroxide of magnesium.

4. The process of producing a halide of a metal which forms a substantially insoluble hydroxide consisting essentially of: admixing a water-soluble hydroxide with a brine containing a salt of such metal to precipitate the hydroxide or the metal to be produced; admixing with said hydroxide an organic water-immiscible solvent which is substantially inert to set halide and hydroxide selected from class consisting of liquid hydrocarbons and liquid halogenated hydrocarbons, and a surface-active emulsifying agent having a greater affinity for hydrocarbons than for water; continuing to agitate the resulting mixture until a stratification occurs whereby an upper water stratum containing water-soluble contaminants and a lower organic stratum containing the metal hydroxide in suspension forms; removing a substantial portion of said upper water stratum; diluting said organic stratum by admixing therewith an organic water-immicsible solvent substantially inert to said halide and hydroxide selected from the class consisting of liquid hydrocarbons and liquid halogenated hydrocarbons to dilute said organic stratum to a concentration of between 1 and 25 percent of said metal hydroxide by weight; passing a hydrogen halide into the thus diluted organic stratum at a temperature of between 25° and 300° C. to convert the metahydroxide present to the corresponding metal halide; and separating the thus formed metal halide from the resulting mixture.

5. The process of making a chloride of a metal having a substantially water-insoluble hydroxide by admixing 1 part by weight of said hydroxide in an aqueous slurry with between 0.1 and 0.75 part of a petroleum oil having a viscosity of less than 5,000 cps. and containing between 1 and 30 percent by weight of a non-ionic surface active emulsifying agent substantially inert to said chloride and hydroxide, based on the petroleum oil; separating the oil containing the hydroxide from the water; reacting the thus separated hydroxide suspended in the oil with HCl having a concentration of between 30 percent by weight in water to about 100 percent as substantially anhydrous HCl gas; and removing the excess oil, surface active emulsifying agent, and water from the metallic chloride thus produced.

6. The process according to claim 5, wherein the petroleum oil is kerosene.

7. The process according to claim 5, wherein the non-ionic surfactant is tall oil.

8. The process of making magnesium chloride of high concentration relatively free from water-soluble contaminants from a natural brine containing a relatively low concentration of magnesium ions consisting of admixing a water soluble hydroxide with said natural brine to precipitate $Mg(OH)_2$; removing a portion of the mother liquor to increase the concentration of the $Mg(OH)_2$ in the remaining mother liquor to between 7 and 75 percent by weight; admixing with the thus concentrated $Mg(OH)_2$ mixture a petroleum oil having a viscosity below 5,000 centipoises containing a non-ionic surface-active emulsifying agent having a greater affinity for the petroleum oil than for the brine, in an amount of between 1 and 30 percent by weight of the petroleum oil to give a weight ratio of oil to $Mg(OH)_2$ of between 0.1 and 0.75 of the oil to 1 of the $Mg(OH)_2$ to produce a phase inversion whereby the $Mg(OH)_2$ is suspended in a lower oil phase and water-soluble contaminants in an upper water phase; separating between about 25 percent and 90 percent of the water in the water phase from the $Mg(OH)_2$-containing oil phase; diluting the remaining $Mg(OH)_2$ oil phase remaining to a $Mg(OH)_2$ concentration of between 1 and 25 percent by weight of the suspension; passing a chlorinating agent selected from the class consisting of concentrated hydrochloric acid and hydrogen chloride gas through the $Mg(OH)_2$-containing oil suspension at a temperature of between 25° and 300° C. to form $MgCl_2$; and recovering the thus formed $MgCl_2$ from the oil.

References Cited in the file of this patent

UNITED STATES PATENTS

| | | |
|---|---|---|
| 1,771,628 | Hirstel | July 29, 1930 |
| 2,833,618 | Creutz et al. | May 6, 1958 |

FOREIGN PATENTS

| | | |
|---|---|---|
| 540,075 | Great Britain | Oct. 3, 1941 |
| 542,156 | Germany | Jan. 25, 1932 |
| 3,755 | Australia | Dec. 15, 1931 |
| 30,205 of 1930 | Australia | Nov. 17, 1931 |